July 23, 1940.  V. JERECZEK  2,208,986
DRIVING DEVICE FOR MILLING MACHINES
Filed Dec. 13, 1938  4 Sheets-Sheet 1
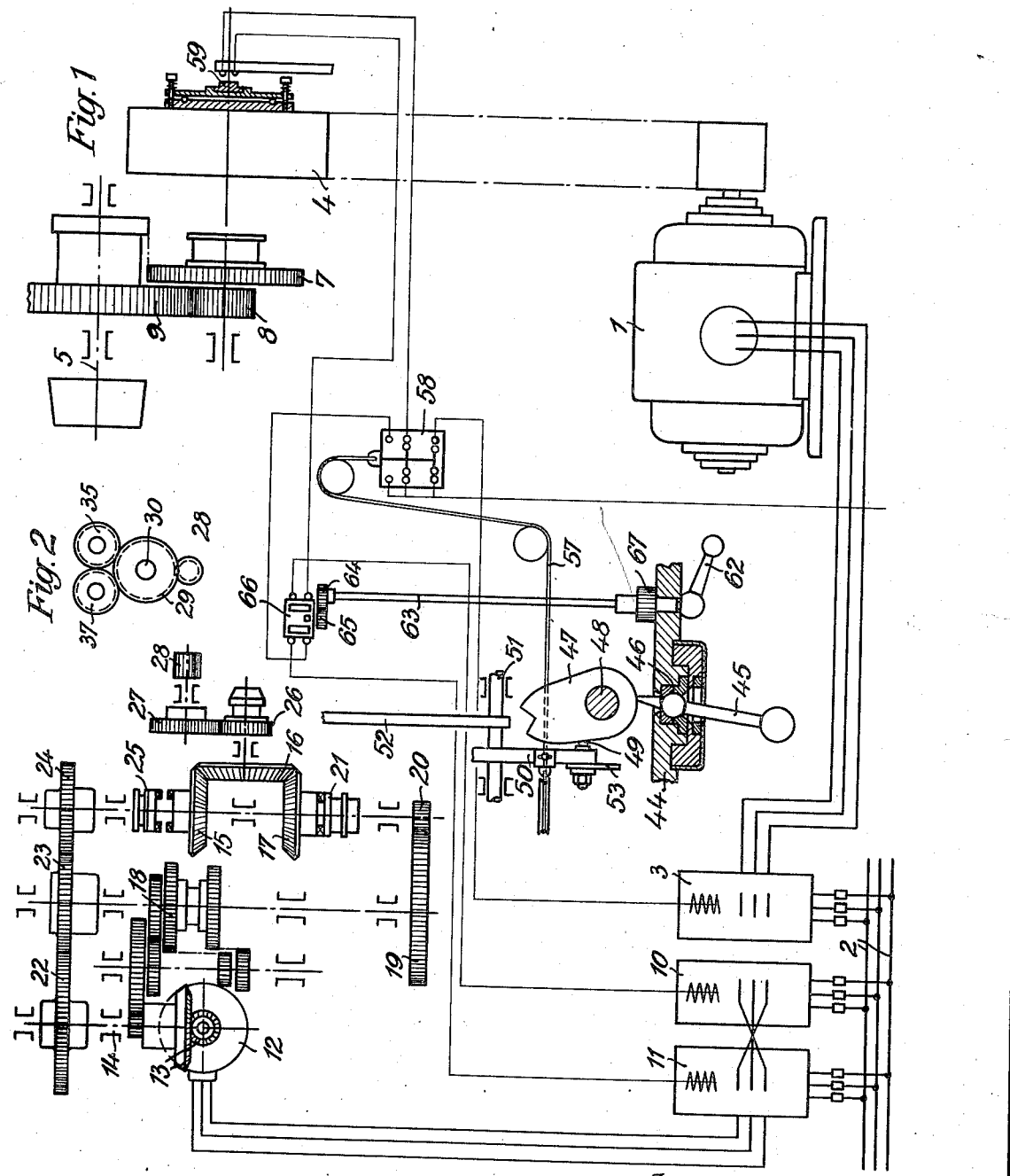
Inventor,
V. Jereczek
by Glascock Downing & Seebold
Attorneys July 23, 1940.  V. JERECZEK  2,208,986
DRIVING DEVICE FOR MILLING MACHINES
Filed Dec. 13, 1938  4 Sheets-Sheet 2
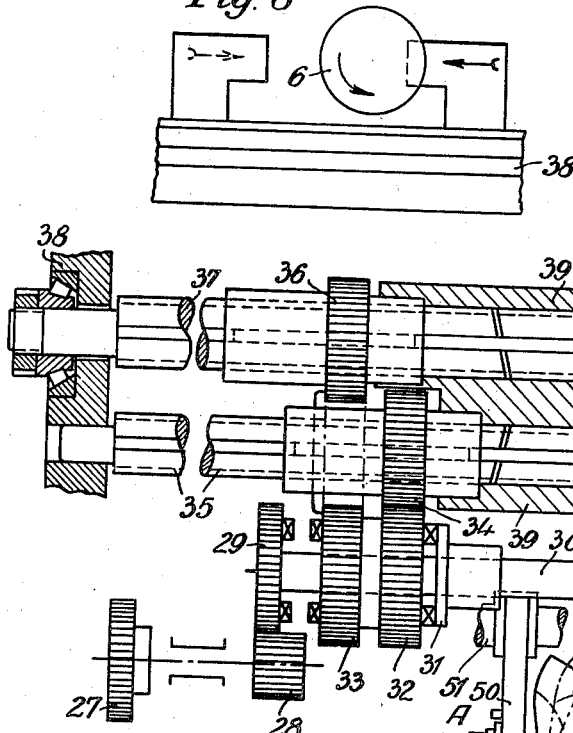
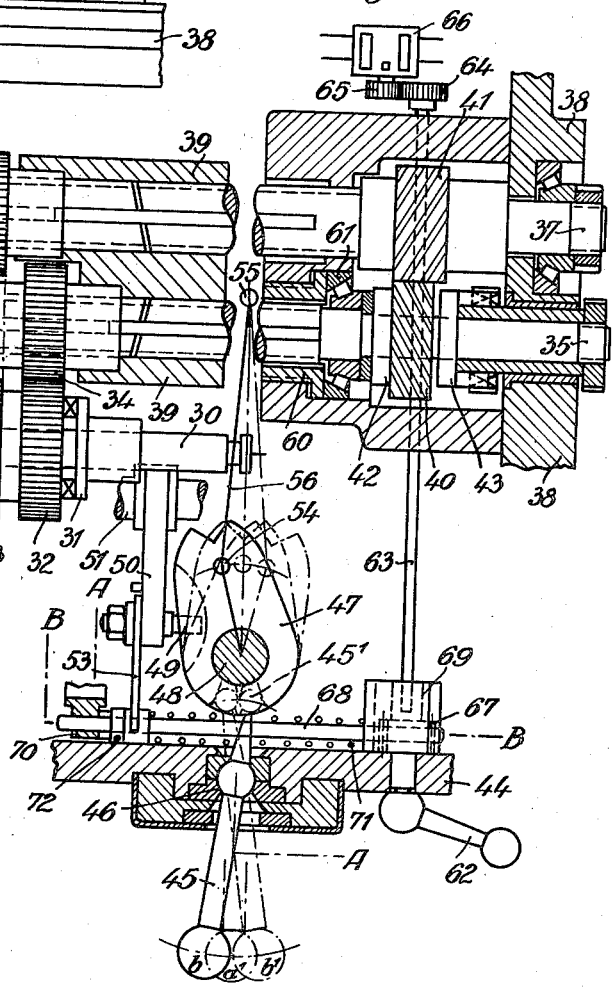
Inventor,
V. Jereczek
by Glascock Downing & Seebold
Attorneys.

July 23, 1940.　　　V. JERECZEK　　　2,208,986
DRIVING DEVICE FOR MILLING MACHINES
Filed Dec. 13, 1938　　　4 Sheets-Sheet 3
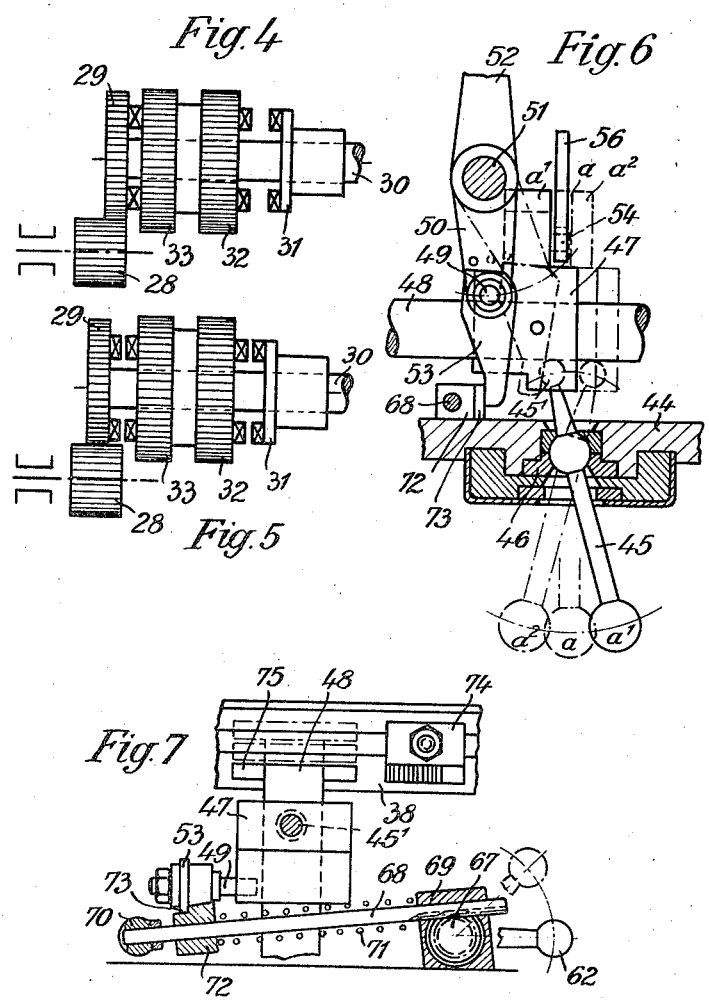

July 23, 1940.　　　V. JERECZEK　　　2,208,986
DRIVING DEVICE FOR MILLING MACHINES
Filed Dec. 13, 1938　　　4 Sheets-Sheet 4
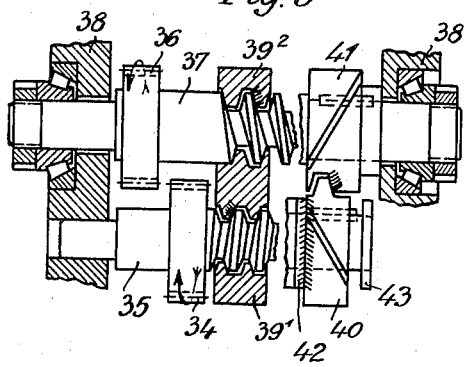
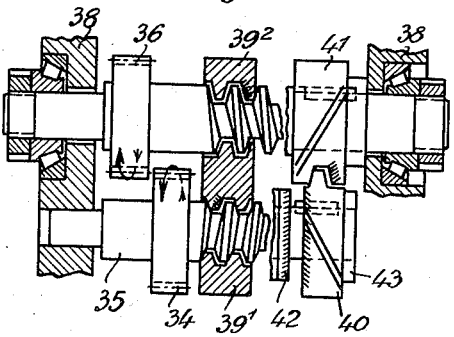
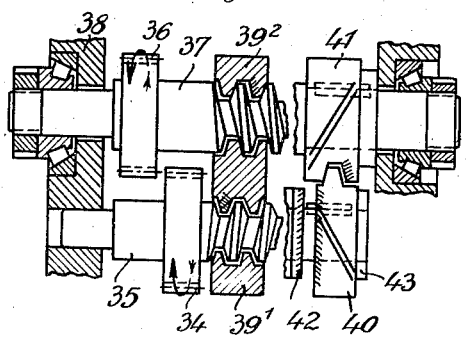
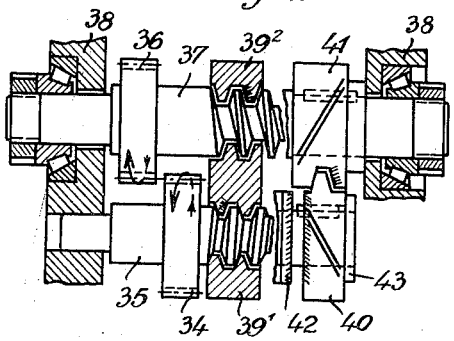
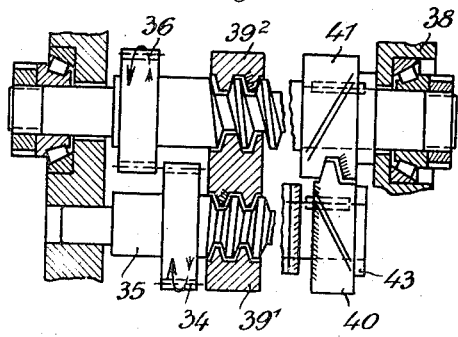
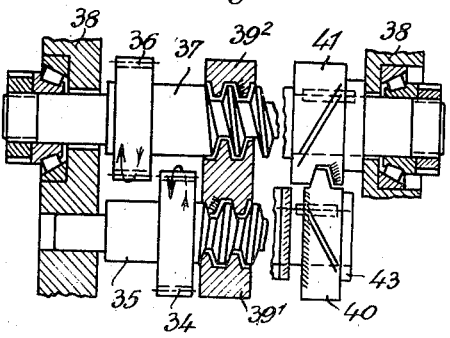
Inventor,
V. Jereczek
by Glascock Downing & Seebold
Attorneys.

Patented July 23, 1940

2,208,986

UNITED STATES PATENT OFFICE 2,208,986

DRIVING DEVICE FOR MILLING MACHINES

Viktor Jereczek, Weissensee, near Berlin, Germany

Application December 13, 1938, Serial No. 245,517
In Germany December 10, 1937

7 Claims. (Cl. 90—22)

My invention relates to an improved driving device for milling machines in which the milling procedure can be carried out equidirectional with the feed of the work-piece, as well as in opposite direction thereto, there being employed in milling machines of this type two threaded spindles, each of which co-operates with a correspondingly threaded nut, the thread-flanks of said spindles being held in contact with the thread-flanks of said nuts, during equidirectional milling, by means of a tensioning force which acts counter to said milling direction, and one of the said spindles being freely axially shiftable with respect to the driven table of the machine.

With milling machines for equidirectional milling it is known to relieve the thread-flanks of the spindles and of the nuts which are in close contact with one another during the equidirectional milling when the direction of motion of the milling table is to be reversed either for the purpose of a quick return-movement of said table or for the purpose of milling in the opposite direction.

With the known driving devices of this type the drawback is experienced that those thread-flanks of the spindles and of the nuts which are engaged during equidirectional milling are necessitated to take part in the working operation when the work-piece is moved towards the milling cutter, as well as when it is moved away from the same. The movement of the milling table in said first-mentioned direction takes place, in fact, up to now even counter to the action of the tensioning force pressing the said thread-flanks against one another, which entails a detrimental wear and tear of the flanks concerned which are especially important for the equidirectional milling.

This drawback is obviated by the present invention which consists therein that according to the direction of motion of the milling table the two threaded spindles can be driven alternately and the axial motion of the shiftable spindle in one direction can be restricted by means of a re-adjustable abutment member in such a manner that, except during the equidirectional milling, that threaded spindle which is not directly driven partakes in the rotation without being subjected to a load so that the thread-flanks subjected to a load during equidirectional milling are not engaged at all other manners of motion of the table, whereby is attained that those thread-flanks engaged during equidirectional milling are employed only during this working performance, but are not engaged during other movements of the table.

With the known driving devices in which the tensioning force is produced by helical-wheels connecting the threaded spindles with one another the arrangement most suitable to the purpose in view is that the helical-wheel arranged on the axially shiftable threaded spindle is shiftable in such a manner that the thread-flanks of the helical-wheels engaged during equidirectional milling are not engaged during the otherwise possible longitudinal movements of the milling table, whereby the length of life of the surfaces engaged during the equidirectional milling is increased.

According to the present invention the changing-over of the motion of the table from equidirectional milling to quick return movement can be obtained by means of a quick-running gearing forming part of the feed gearing, whereas the changing-over to milling in the other direction is effected by reversing the poles of an electric feed motor, whereby the two movements of the table can be obtained in a very simple manner with different speeds.

The invention is illustrated diagrammatically and by way of example on the accompanying drawings, on which—

Figure 1 is a general view of a milling machine controlled semi-electrically and semi-automatically for effecting equidirectional milling and milling in the direction opposite thereto.

Figure 2 is a view of some of the driving wheels.

Figure 3 is a horizontal section through the feed mechanism for the milling table.

Figures 4 and 5 show two different positions of a member of the mechanism shown in Fig. 3.

Figure 6 is a vertical section on the line A—A of Fig. 3.

Figure 7 is a vertical section on the line B—B of Fig. 3.

Figure 8 is a side-view of a part of the milling machine table. And the

Figures 9-14 show in sections the various positions of the members of the feed mechanism at the several speeds and directions.

Referring to Fig. 1, 1 denotes the main driving motor which is supplied with current from the distributing bars 2 across the protector 3 and which drives a belt pulley 4 supported in known members not shown. 5 denotes the main spindle of the machine which is driven by the intermediary of gear wheels 7, 8 and 9. The milling cutter 6 (Fig. 8) is connected with said spindle 5.

12 denotes the feed motor which is supplied with current across the protector 11 and drives a shaft 14 by the intermediary of bevel-wheels 13 driving in turn a bevel-wheel reversing gearing 15, 16, 17 either by the intermediary of a change-speed gearing 18 and of a pair of wheels 19, 20 across a clutch 21 co-operating with the bevel-wheel 17, or by the intermediary of wheels 22, 23, 24 across a clutch 25 co-operating with the bevel-wheel 15, these members constituting the quick-motion gearing.

On the shaft of the bevel-wheel 16 is a cog-wheel 26 meshing with a second wheel 27, to the axle of which a driving pinion 28 is affixed. This meshes with a cog-wheel 29 (Figs. 3-5) secured to a shiftable shaft 30 and provided with clutch claws. On the shaft 30 is, besides, a clutch disk 31 likewise provided with clutch claws. When the shaft 30 is shifted in the one or the other direction the clutch claws of the disk 31 can be brought into engagement with counter claws of a cog-wheel 32 (Fig. 3), or the clutch claws of the cog-wheel 29 can be brought into engagement with counter-claws of a cog-wheel 33 (Fig. 4). The cog-wheels 32 and 33 which can rotate independently from one another can, thereby be coupled with the shaft 30 just as required. The wheel 32 meshes with a cog-wheel 34 having a long hub and being non-rotatably arranged on a threaded spindle 35. The wheel 33 meshes with a cog wheel 36 having likewise a long hub and being likewise non-rotatably supported on a second threaded spindle 37. For the sake of distinctness the shaft 30 is shown in Fig. 3 as lying in one plane with the spindles 35 and 37, although said shaft is located below said spindles, as appears from Fig. 2. The two spindles are supported in the milling table 38, the arrangement being such that the spindle 35 is freely axially shiftable, whereas the spindle 37 is firmly connected with the table. The threads of said spindles run counter to one another, or in opposite directions respectively, and can turn in a member 39 firmly secured to the machine frame and provided with the appertaining internal threads. The transfer of the rotary motion from the one threaded spindle to the other is effected by two helical-wheels 40 and 41. The wheel 40 is not turnable on the spindle 35, but is axially shiftable between abutment rings 42 and 43. The wheel 41 is firmly affixed to the spindle 37. When the spindles 35 and 37 are turned in the one or the other direction the milling table 38 with the work-piece thereon will be moved in the one or the other direction.

On the cross-bed 44 (Figs. 1, 3 and 6) is rotatably supported a two-armed control lever 45 in a ball-shaped bearing 46. The ball-shaped inner end 45$^1$ of said lever engages a control slide 47 which is turnable on a vertical axle 48 and also shiftable along the same. The turning movements and the sliding movements of the control member 47 are carried out by means of the main control lever 45. A lateral groove of said member 47 is engaged by a pivot 49 attached to a lever 50. This lever is affixed to a horizontal shaft 51 provided with another lever 52. The levers 50 and 52 are moved upwardly and downwardly respectively by the sliding movements of the said control member 47. By reason of these movements of this member the lever 52 actuates in a manner not shown the clutches 21 and 25 so as to engage and disengage them.

Attached to the lever 50 is a pawl 53, the purpose of which will be described hereinafter.

A pivot 54 secured to the control member 47 engages a lever 56 turnable on an axle 55, and said lever engages a recess provided in the clutch shaft 30. By turning the control member 47 the clutch shaft 30 will be moved to and fro whereby the clutches 29 and 31 will be engaged or disengaged according to the direction of movement of said shaft.

The control for the various movements of the milling table is effected as follows.

I. Equidirectional milling

The main control lever 45 is moved upwardly from its middle position $a$ (Fig. 6) into the position $a^1$ whereby its inner end 45$^1$ shifts the member 47 downwardly from said middle position $a$ into said other position $a^1$. Owing to this downward movement, the lever 50 is likewise swung downwardly by the intermediary of the pivot 49 whereby the shaft 51 supported in the transverse bed 44 of the milling table 38 will be turned. The lever 52 secured to this shaft will thereby be turned upwardly, whereby the clutch 21 (Fig. 1) serving for initiating the working phase to be carried out is engaged by suitable intermediate means, for instance by the intermediary of a set of levers (not shown). By reason of the downward movement of the lever 50 there is at the same time an electric switch 58 moved into the position shown in Fig. 1 by means of a Bowden cable 57 or the like whereby the circuit containing the conducting wires pertaining to the protector 3 is closed and the main motor 1 commences to run. As soon as the belt pulley 4 has attained the requisite number of revolutions, a switch 59 operated by centrifugal action conducts the current across the protector 10 to the feed motor 12 which now likewise commences to rotate. Owing hereto, and by the intermediary of the change-speed gearing 18, the toothed wheels 19 and 20, the clutch 21, the bevel wheels 17 and 16, the shifting wheel 26, and the cog-wheels 27, 28 and 29, the clutch shaft 30 (Fig. 3) is rotated. The clutches of this shaft are at this time in the middle positions shown in Fig. 5.

The main control lever 45 is now turned away from its vertical middle position $a^1$ (Fig. 3) laterally to the left, so as to assume the position $b$ (Fig. 3), whereby the control member 47 on the axle 48 is turned from its middle position to the left into the position shown in full lines whereby, further, the shaft 30 is moved in the same direction. The coupling disk 31 is thereby brought into engagement with the wheel 32 whereby this wheel is driven and drives in turn the threaded spindle 35 across the wheel 34. The spindle 35 abuts with its left-hand thread-flanks on the right-hand flanks of the nut 39$^1$ (Fig. 9). Owing to the inclined toothing of the helical wheels 40 and 41 the wheel 40 will, when the spindle 35 is being rotated in the direction indicated in Fig. 9, be shifted to the left and pressed against the ring 42. The helical wheel 41 which is firmly affixed to the spindle 37 is at the same time pressed to the right whereby the right-hand thread-flanks of the spindle 37 will be drawn against the left-hand flanks of the nut 39$^2$. The effect of these movements is that, prior to the actual commencement of the feed, first all dead plays between the members of the feed gearing and between the latter and the table are done away with, whereby the members assume the position shown in Fig. 9. The position of the flanks of the threaded spindles 35, 37, of the nuts 39$^1$, 39$^2$ and of the helical wheel 40, 41 which are engaged during equidirectional milling is indicated in Fig. 9 by oblique hatching.

At the end of the milling phase the several driving members and mechanisms are disengaged either automatically or manually.

It will now be shown that the flanks important for equidirectional milling remain completely unaffected at all other movements of the milling table.

II. Quick return movement at equidirectional milling

The main control lever 45 is moved downwardly into its lowermost position $a^2$ (Fig. 6). Owing to this movement, the control member 47 is lifted, whereby the lever 50 is turned upwardly and the lever 52 downwardly so that the quick-motion clutch 25 (Fig. 1) is engaged. Simultaneously therewith the electric switch 58 is by the upward movement of the lever 50 switched off by means of the Bowden cable 57 in such a manner that solely the feed motor 12 is started across the protector 10, whereas the main motor 1 remains switched off. The feed motor 12 drives, across the quick-motion wheels 22, 23, 24, the clutch 25, the bevel-wheels 15 and 16, the shifting wheel 26 and the cog-wheels 27, 28 and 29, the clutch shaft 30 in the direction opposite to the direction for equidirectional milling described above.

Now the main control lever 45, while being in its lowermost position, is again shifted to the left into the position b (Fig. 3) whereby the control member 47 is turned to the left and the clutch shaft 30 is shifted to the left by means of the lever 56, whereby, in turn, the wheel 32 is coupled with the shaft 30 and the screw-spindle 35 is driven across the wheel 34. The spindle 35 abuts at this time with its right-hand flanks on the left-hand flanks of the nut $39^1$ (see Fig. 10) and is at first moved separately to the left until the roller bearing 61 which is adjustable by a nut 60 (Fig. 3) is tightened. Owing to the likewise reversed direction of rotation of the helical wheels 40 and 41 the wheel 40 is pressed to the right against the ring 43 (see Fig. 10). This takes place so early that the left-hand flanks of the spindle 37 cannot be made to contact with the right-hand flanks of the nut $39^2$ by the movement of the table 38, as appears from Fig. 10, from which appears furthermore that those flanks of the spindles, of the nuts and of the helical wheels which are active at equidirectional milling are not active during the reversed movement of the milling table.

At the end of the return-movement the driving mechanism is switched off automatically or manually.

III. Quick forward movement for equidirectional milling

In order to lead the work-piece by quick-motion to the milling cutter, the main control lever 45 is swung downwardly into the position $a^2$ (Fig. 6) whereby in the manner described above under the numeral II the quick-motion clutch 25 is engaged. The main control lever 45 is now moved to the right into the position $b^1$ (Fig. 3), whereby the clutch shaft 30 is shifted to the right by means of the control member 47 and the lever 56, so that the toothed wheel 29 is coupled with the wheel 33. This wheel drives the screw spindle 37 across the wheel 36. Also the spindle 35 is driven by means of the helical wheel 41 which is secured to the spindle 37 and meshes with the helical wheel 40 which is affixed to the screw spindle 35. As has already been mentioned, the spindle 37 is not axially movable in the table 38, whereas the spindle 35 is axially freely movable in the table. Owing to that arrangement of the spindle 37 and of the helical wheel 41 the spindle 37 must rotate for a longer time in order to remove the back lash between its left-hand flanks and the right-hand flanks of the nut $39^2$, and owing to the reversed direction of rotation relatively to the return motion the helical wheel 41 exerts an axial thrust to the right on the helical wheel 40 so that this wheel maintains the flank contact which had existed prior thereto, viz. during the quick return motion. By the instantaneous starting of the spindle 35 is caused that the right-hand thread-flanks of this spindle get disconnected from the left-hand flanks of the nut $39^1$ and are moved away from them until the left-hand flanks of the spindle 37 contact with the right-hand flanks of the nut $39^2$. The position of the parts as now existing appears from Fig. 11. The flanks important for equidirectional milling are not engaged also during the quick forward movement.

IV. Milling in opposite direction

To carry out this usual manner of milling first the main control lever 45 is lifted into the position $a^1$ (Fig. 6), whereby the clutch 21 for the working phase or course is engaged. Thereafter the lever 45 is turned to the left into the position b (Fig. 3) whereby the wheel 32 is coupled with the shaft 30. But prior thereto the control lever 62 (Figs. 1, 3 and 7) must be turned into the lower position shown in Fig. 7 whereby a shaft 63 connected with said lever will be turned and a pole reversing switch 66 will be reversed by the intermediary of the gear wheels 64 and 65, so that also the poles of the feed motor 12 will be reversed across the protector 11, in consequence whereof the motor will run in the opposite direction. The gear wheel 32 drives now the screw spindle 35 in a direction opposite to that used during equidirectional milling.

As shown in Fig. 12, the contact of the flanks of the members concerned when operating in the manner described in the paragraph denoted IV is the same as with the quick return movement disclosed in Fig. 10, there being only the difference that the drive does not take place across the quick-motion clutch 25, but across the clutch 21 for the normal working course, and the change of the direction of rotation is obtained by reversing the poles of the feed motor.

Also with this manner of operation the flanks important for equidirectional milling are not engaged.

In order to secure the control lever 62 and the pole reversing switch 66 in the position requisite for milling in the opposite direction the following mechanism has been designed.

On the axle of rotation of the lever 62 is a toothed wheel 67 which meshes with a rack 68 (Figs. 3 and 7) shiftably guided in two bearings 69 and 70 provided at the inner wall of the cross bed 44. On said rack is fixed a cam 72 and between this cam and the bearing 69 is on the rack a spring 71 which is subjected to tension when the lever 62 is turned into the position shown in full lines in Fig. 7. On said cam bears the front end of a pawl 53 which is hinged to the lever 50. By turning the lever 62 the cam 72 is shifted to the right (Fig. 7) whereby the pawl 53 will be caused to fall behind the step 73 either by its weight or by an appropriate loading, and will be retained in this position by the tension of said spring, whereby the lever 62 and the pole reversing switch 66 will be secured in the position for counter-directional milling.

As soon as the milling operation has been finished the main control lever 45 is turned back into its middle position either manually or by means of the abutment members 74 and 75 (Fig. 7), whereby also the pawl 53 will be disengaged in a positive manner. The spring 71 which had been subjected to tension prior thereto will now shift the rack 68 whereby the lever 62 will be turned into its upper position for equidirectional milling and also the pole reversing switch 66 will be reversed for equidirectional milling. By this automatic reversal is attained that the machine is continually in the state requisite for equidirectional milling so that errors in the manipulation of the machine are obviated.

V. Quick return movement for counter-directional milling

The control movements therefor requisite correspond with those necessary to carry out the quick forward movement for equidirectional milling, see paragraph III. From Fig. 13 appears that the contact between the flanks is the same as with the quick forward movement for equidirectional milling and that the flanks important for equidirectional milling are not affected.

VI. Quick forward movement for counter-directional milling

The control movements are the same as described for quick return movement for equidirectional milling with respect to Fig. 10, and the flank contacts are, therefore, likewise the same as in Fig. 10, as shown in Fig. 14.

Also in this case the flanks important for equidirectional milling remain unaffected.

The device constituting the present invention renders possible to effect the milling in two directions, or to carry out the so-called pendulum milling respectively.

I claim:

1. A driving device for a milling machine of the kind described, in combination with the table of the machine, two threaded spindles, one of said spindles being axially shiftable with respect to said table, a single member fixed to the main frame and having oppositely threaded bores for receiving both of the spindles, means for driving alternately one or the other of said two spindles, toothed wheels for connecting said two spindles with one another, helical wheels connecting the two spindles together to eliminate back lash with respect to said spindles and nuts, one helical wheel being fixed to the fixed spindle and the other helical wheel being shiftable on the shiftable spindle and adjustable bearing means to restrict the axial movement of said shiftable spindle, in such a manner that, except during equidirectional milling, the threaded spindle not directly driven rotates idly and that the use of the threads flanks subjected to load during equidirectional milling at the other movements of said table is obviated.

2. A driving device as specified in claim 1, in which the means for driving alternately the one or the other of said two spindles includes a main driving pinion, a secondary intermediate shiftable shaft, a cogwheel fixed to the latter and meshing with the main driving pinion and having a clutch claw on one face, a clutch disc also fixed on the shiftable shaft, other cogwheels mounted on the last mentioned shiftable shaft and respectively meshing with the toothed wheels on the spindles and provided with clutch claws for respectively cooperating with the claws on the first mentioned cogwheel and the clutch disc whereby when the intermediate shaft is shifted the desired rotation will be imparted to the spindles.

3. A driving device as claimed in claim 1, in which a main driving pinion is provided and is operably associated with the means for alternately driving one or the other of said two spindles, reversing gearing operatively connected with the said driving pinion, a main feed motor having reversible poles, change speed gearing operatively connected with the feed motor, a train of gearing between the change speed gearing and the reversing gearing and capable of being disconnected therefrom, a quick driving gearing between the main feed motor and the reversing gearing and capable of being disconnected therefrom, and manually operable control means for controlling the connection of said gearings with the reversing gearing.

4. A driving device for milling machines, comprising in combination with the table of the machine, two threaded spindles, one of said spindles being axially shiftable with respect to said table, adjustable means to restrict the axial movement of said shiftable spindle, each of said spindles cooperating with a corresponding nut, a gearing for driving alternately one or the other of said two spindles, a reversing gear for driving said spindles in one or the other direction, two helical wheels for connecting said two spindles with one another, the helical wheel on said shiftable threaded spindle being axially shiftable, and abutments for limiting the axial movement of said helical wheel, in such a manner that, except during equidirectional milling, the threaded spindle not directly driven rotates idly.

5. A driving device for milling machines, comprising in combination with the table of the machine, two threaded spindles, one of said spindles being axially shiftable with respect to said table, adjustable means to restrict the axial movement of said shiftable spindle, each of said spindles cooperating with a corresponding nut, a gearing for driving alternately one or the other of said two spindles, a reversing gear for driving said spindles in one or the other direction, two helical wheels for connecting said two spindles with one another, the helical wheel on said shiftable threaded spindle being axially shiftable, and abutments for limiting the axial movement of said helical wheel, in such a manner that, except during equidirectional milling, the threaded spindle not directly driven rotates idly, and that those of the thread flanks of said helical wheels which are engaged during equidirectional milling are not engaged at the other longitudinal movement of said milling table.

6. A driving device for milling machines, comprising in combination with the table of the machine, two threaded spindles, one of said spindles being axially shiftable with respect to said table, adjustable means to restrict the axial movement of said shiftable spindle, each of said spindles cooperating with a corresponding nut, a gearing for driving alternately one or the other of said two spindles, a reversing gear for driving said spindles in one or the other direction, two helical wheels for connecting said two spindles with one another, the helical wheel on said shiftable threaded spindle being axially shiftable, and abutments for limiting the axial movement of said helical wheel, in such a manner that, except during equidirectional milling, the threaded spindle not directly driven rotates idly, a quick-drive gearing for changing over the table movement from equidirectional milling to quick return movement, a feed motor for said table, and means for reversing the poles of said feed motor.

7. A driving device for milling machines, comprising in combination with the table of the machine, two threaded spindles, one of said spindles being axially shiftable with respect to said table, adjustable means to restrict the axial movement of said shiftable spindle, each of said spindles co-operating with a corresponding nut, a gearing for driving alternately one or the other of said two spindles, a reversing gear for driving said spindles in one or the other direction, two helical wheels for connecting said two spindles with one another, the helical wheel on said shiftable threaded spindle being axially shiftable, and abutments for limiting the axial movement of said helical wheel, in such a manner that, except during equidirectional milling, the threaded spindle not directly driven rotates idly, a quick-drive gearing for changing over the table movement from equidirectional milling to quick return movement, a feed motor for said table, a switching lever for reversing the poles of said feed motor, a device for locking said switching lever in the position for milling in opposite direction, and a spring to return said switching lever to the position for equidirectional milling.

VIKTOR JERECZEK.